United States Patent
Morikawa et al.

(10) Patent No.: US 11,641,853 B2
(45) Date of Patent: May 9, 2023

(54) SPREADING AGENT FOR AGROCHEMICALS, AND AGROCHEMICAL SPRAY SOLUTION

(71) Applicant: KURARAY CO., LTD., Kurashiki (JP)

(72) Inventors: Keisuke Morikawa, Houston, TX (US); Taeko Kaharu, Chiba (JP)

(73) Assignee: KURARAY CO., LTD., Kurashiki (JP)

( * ) Notice: Subject to any disclaimer, the term of this patent is extended or adjusted under 35 U.S.C. 154(b) by 408 days.

(21) Appl. No.: 16/641,002

(22) PCT Filed: Aug. 24, 2018

(86) PCT No.: PCT/JP2018/031342
§ 371 (c)(1),
(2) Date: Feb. 21, 2020

(87) PCT Pub. No.: WO2019/039588
PCT Pub. Date: Feb. 28, 2019

(65) Prior Publication Data
US 2020/0214284 A1    Jul. 9, 2020

(30) Foreign Application Priority Data
Aug. 24, 2017 (JP) ............................. JP2017-161179

(51) Int. Cl.
| | |
|---|---|
| *A01N 25/24* | (2006.01) |
| *C08F 216/06* | (2006.01) |
| *C08F 16/06* | (2006.01) |
| *C08L 23/08* | (2006.01) |

(52) U.S. Cl.
CPC ............ *A01N 25/24* (2013.01); *C08F 16/06* (2013.01); *C08F 216/06* (2013.01); *C08L 23/0846* (2013.01); *C08F 2800/10* (2013.01)

(58) Field of Classification Search
CPC ............................ C08L 29/04; C08F 216/06
See application file for complete search history.

(56) References Cited

U.S. PATENT DOCUMENTS

| | | |
|---|---|---|
| 2007/0225421 A1 | 9/2007 | Origuchi et al. |
| 2016/0130763 A1* | 5/2016 | Kawagoe ............... D21H 19/40 |
| | | 428/452 |
| 2016/0262381 A1 | 9/2016 | Furo et al. |
| 2019/0338115 A1* | 11/2019 | Fukuhara ................ C08L 29/04 |
| 2020/0087860 A1* | 3/2020 | Morikawa ............... D21H 19/32 |
| 2020/0396990 A1* | 12/2020 | Kaharu .................. C08F 218/08 |
| 2021/0179900 A1* | 6/2021 | Fukuhara ................ C08K 5/098 |

FOREIGN PATENT DOCUMENTS

| | | |
|---|---|---|
| JP | 8-217604 A | 8/1996 |
| JP | 2001-271222 A | 10/2001 |
| JP | 2009-221461 A | 10/2009 |
| JP | 2015-134704 A | 7/2015 |
| JP | 2016-222569 A | 12/2016 |
| WO | WO 2006/022147 A1 | 3/2006 |
| WO | WO 2016/013221 A1 | 1/2016 |
| WO | WO 2019/093315 A1 | 5/2019 |

OTHER PUBLICATIONS

Indian Office Action dated Jun. 25, 2021 in Indian Patent Application No. 202017007387, 6 pages.
International Search Report dated Nov. 20, 2018 in PCT/JP2018/031342 filed on Aug. 24, 2018, 2 pages.
Extended European Search Report dated May 12, 2021 in European Patent Application No. 18848483.6, 6 pages.

* cited by examiner

*Primary Examiner* — Jeffrey C Mullis
(74) *Attorney, Agent, or Firm* — Oblon, McClelland, Maier & Neustadt, L.L.P.

(57) ABSTRACT

The present invention provides a spreading agent for agrochemicals having excellent spreadability particularly against surfaces of plant leaves. The present invention also provides an agrochemical spray solution comprising the spreading agent for agrochemicals, and that shows excellent storage stability (particularly viscosity stability) even during long storage. The present invention relates to a spreading agent for agrochemicals that comprises an ethylene-modified vinyl alcohol polymer (A) having an ethylene unit content of 1.0 mol % to 19 mol %, a 1,2-glycol linkage unit content of 1.2 mol % to 2.0 mol %, a viscosity-average degree of polymerization of 200 to 5,000, and a degree of saponification of 80 mol % to 99.9 mol %.

10 Claims, No Drawings

SPREADING AGENT FOR AGROCHEMICALS, AND AGROCHEMICAL SPRAY SOLUTION

TECHNICAL FIELD

The present invention relates to a spreading agent for agrochemicals comprising a specific ethylene-modified vinyl alcohol polymer and having excellent spreadability, particularly against surfaces of plant leaves, and to an agrochemical spray solution comprising the spreading agent for agrochemicals and having excellent storage stability (particularly viscosity stability).

BACKGROUND ART

A spray solution as a dilute aqueous solution of agrichemicals is in common use in agriculture. However, when such a spray solution is directly sprayed onto a plant surface, the active component of the agrichemicals contained in the solution often fails to retain its effect as a result of running off the surface such as when there is rain, or falling down to the ground by being removed by winds.

Against this backdrop, an agrochemical spray solution containing a spreading agent has been used to make the active component of agrichemicals more adherent to a plant surface. Examples of spreading agents that are currently in common use include polyoxyethylene alkyl phenyl ether, polyoxyethylene alkyl ether, polyoxyethylene fatty acid ester, lignin sulfonate, and naphthyl methane sulfonate, which all have the property to lower the surface tension of spray solution to improve adhesiveness or spreadability against not easily wettable insect bodies and crop plants for improved protection against insects. A drawback, however, is that these common spreading agents have a very strong affinity for water, and it is still not possible to reduce run-off, such as when there is rain. Sticky spreading agents, such as polyoxyethylene resin acid ester, paraffin, and polyvinyl acetate are available. However these spreading agents also involve a number of issues, including inability to show effect in low concentrations, and formation of a coating that, once dried, does not dissolve in water, and stays on plant surface for prolonged time periods.

There have been proposed polyvinyl alcohol-containing agrichemical spreadable compositions and liquid spray solutions for agriculture, as disclosed in Patent Literature 1 and Patent Literature 2. However, the polyvinyl alcohols disclosed in these publications easily dissolve in water because of low degrees of saponification, causing the agrichemicals to easily run off such as when there is rain.

Patent Literature 3 proposes crosslinking a specific polyvinyl alcohol resin to prevent agrichemicals from running off such as when there is rain. However, while crosslinking of polyvinyl alcohol resin is able to prevent run-off of agrichemicals, a mixed solution of polyvinyl alcohol resin and cross-linking agent has poor storage stability due to a reaction that takes place between the polyvinyl alcohol resin and the cross-linking agent.

CITATION LIST

Patent Literature

Patent Literature 1: JP H08-217604 A
Patent Literature 2: JP 2015-134704 A
Patent Literature 3: JP 2016-222569 A

SUMMARY OF INVENTION

Technical Problem

The present invention has been made to find a solution to the foregoing problems, and it is an object of the present invention to provide a spreading agent for agrochemicals having excellent spreadability, particularly against surfaces of plant leaves. Another object of the present invention is to provide an agrochemical spray solution comprising the spreading agent for agrochemicals, and that shows excellent storage stability (particularly viscosity stability) even during long storage.

Solution to Problem

The present inventors conducted extensive studies, and found that the foregoing problems can be solved by a spreading agent for agrochemicals comprising a specific ethylene-modified vinyl alcohol polymer. The present invention was completed on the basis of this finding.

Specifically, the present invention relates to the following.
[1] A spreading agent for agrochemicals, comprising an ethylene-modified vinyl alcohol polymer (A) having an ethylene unit content of 1.0 mol % to 19 mol %, a 1,2-glycol linkage unit content of 1.2 mol % to 2.0 mol %, a viscosity-average degree of polymerization of 200 to 5,000, and a degree of saponification of 80 mol % to 99.9 mol %.
[2] The spreading agent for agrochemicals according to [1], wherein the ethylene-modified vinyl alcohol polymer (A) has a degree of saponification of 95 mol % to 99.7 mol %.
[3] The spreading agent for agrochemicals according to [1] or [2], wherein the spreading agent further comprises 0.1 ppm to 3,000 ppm of a compound (B) having a conjugated double bond and a molecular weight of 1,000 or less.
[4] The spreading agent for agrochemicals according to [3], wherein the compound (B) is (i) a compound (B-1) having an unsaturated aliphatic group with a conjugated double bond, or (ii) a compound (B-2) forming a conjugated double bond with an unsaturated aliphatic group and an aromatic group.
[5] The spreading agent for agrochemicals according to [3] or [4], wherein the compound (B) is a conjugated diene compound.
[6] The spreading agent for agrochemicals according to any one of [3] to [5], wherein the compound (B) has at least one functional group selected from the group consisting of a carboxy group and salts thereof, a hydroxyl group, an ester group, a carbonyl group, an ether group, an amino group, a dialkylamino group, an imino group, an amide group, a cyano group, a diazo group, a nitro group, a mercapto group, a sulfone group, a sulfoxide group, a sulfide group, a thiol group, a sulfonic acid group and salts thereof, a phosphoric acid group and salts thereof, a phenyl group, and a halogen atom.
[7] The spreading agent for agrochemicals according to any one of [3] to [6], wherein the compound (B) is a compound (B-1) having an unsaturated aliphatic group with a conjugated double bond, and the compound (B-1) has a polar group.
[8] The spreading agent for agrochemicals according to [7], wherein the polar group is a compound having at least one functional group selected from the group consisting of a carboxy group and salts thereof, a hydroxyl group, an ester group, a carbonyl group, an ether group, an amino group, a dialkylamino group, an imino group, an amide group, a cyano group, a diazo group, a nitro group, a mercapto group, a sulfone group, a sulfoxide group, a sulfide group, a thiol group, a sulfonic acid group and salts thereof, a phosphoric acid group and salts thereof, and a halogen atom.

[9] An agrochemical spray solution comprising the spreading agent for agrochemicals of any one of [1] to [8], an active agrichemical component, and water.

[10] The agrochemical spray solution according to [9], wherein the content of the active agrichemical component is 0.1 parts by mass to 1,000 parts by mass relative to 100 parts by mass of the ethylene-modified vinyl alcohol polymer (A).

[11] The agrochemical spray solution according to [9] or [10], wherein the agrochemical spray solution has a ratio ($\eta_{1\text{-}week}/\eta_{initial}$) of less than 5 at 5° C. and 12 rpm, wherein $\eta_{initial}$ is an initial viscosity of the agrochemical spray solution, and $\eta_{1\text{-}week}$ is a viscosity of the agrochemical spray solution left to stand for 1 week.

Advantageous Effects of Invention

A spreading agent for agrochemicals of the present invention has excellent spreadability, particularly against surfaces of plant leaves. An agrochemical spray solution comprising the spreading agent for agrochemicals shows excellent storage stability (particularly viscosity stability) even during long storage.

DESCRIPTION OF EMBODIMENTS

The following specifically describes a spreading agent for agrochemicals, and an agrochemical spray solution of the present invention. It is to be noted that the present invention is not limited to the embodiments described below. In the present specification, the upper limits and lower limits of numeric ranges (ranges of, for example, contents of components, values calculated from components, and values of physical properties) can be combined appropriately.

Spreading Agent for Agrochemicals

A spreading agent for agrochemicals of the present invention comprises an ethylene-modified vinyl alcohol polymer (A) (hereinafter, "vinyl alcohol polymer" is also referred to as "PVA" for short) having an ethylene unit content of 1.0 mol % to 19 mol %, a 1,2-glycol linkage unit content of 1.2 mol % to 2.0 mol %, a viscosity-average degree of polymerization of 200 to 5,000, and a degree of saponification of 80 mol % to 99.9 mol %. By containing a hydrophobic ethylene unit, the ethylene-modified PVA(A) is able to more effectively prevent agrichemicals from running off such as when there is rain, and, by the absence of a crosslinked structure, an agrochemical spray solution containing the spreading agent for agrochemicals has excellent long-term storage stability.

Ethylene-Modified PVA(A)

The ethylene-modified PVA(A) has an ethylene unit content of 1.0 mol % to 19 mol %, preferably 1.5 mol % to 15 mol %, even more preferably 2.0 mol % to 12 mol %. With an ethylene unit content of less than 1.0 mol %, the agrochemical spray solution obtained forms a coating that lacks sufficient waterfastness, and cannot sufficiently prevent agrichemicals from running off such as when there is rain. The viscosity stability of the agrochemical spray solution also becomes insufficient. With an ethylene unit content of more than 19 mol %, a difficulty arise in dissolving the ethylene-modified PVA(A) in water.

The ethylene unit content in the ethylene-modified PVA(A) is determined by, for example, $^1$H-NMR measurement of an ethylene unit-containing vinyl ester copolymer as a precursor or a re-acetified product of the ethylene-modified PVA. Specifically the vinyl ester copolymer obtained is thoroughly purified at least three times by reprecipitation with n-hexane/acetone, and dried under reduced pressure at 80° C. for 3 days to produce a vinyl ester copolymer to be analyzed. The polymer is dissolved in DMSO-$d_6$, and subjected to $^1$H-NMR (e.g., 500 MHz) measurement at 80° C. The ethylene unit content can then be calculated from the peak (4.7 to 5.2 ppm) derived from the main-chain methylene of vinyl ester, and the peaks (0.8 to 1.6 ppm) derived from the main-chain methylene of ethylene, vinyl ester, and a third component.

The ethylene-modified PVA(A) has a viscosity-average degree of polymerization (hereinafter, also referred to simply as "degree of polymerization") of 200 to 5,000, preferably 300 to 4,000, more preferably 350 to 3,000, even more preferably 500 to 2,500. With a viscosity-average degree of polymerization of less than 200, the agrochemical spray solution obtained forms a coating that lacks sufficient waterfastness, and cannot sufficiently prevent agrichemicals from running off such as when there is rain. Production of ethylene-modified PVA(A) is difficult with a viscosity-average degree of polymerization of more than 5,000. The viscosity-average degree of polymerization (P) of ethylene-modified PVA(A) is determined according to JIS K 6726 (1994). Specifically, the viscosity-average degree of polymerization (P) of ethylene-modified PVA(A) is determined from the limiting viscosity [η] (dL/g) measured in 30° C. water after purification of a re-saponified ethylene-modified PVA, using the following formula.

$$P=([\eta]\times 10^3/8.29)^{(1/0.62)}$$

The ethylene-modified PVA(A) has a degree of saponification of 80 mol % to 99.9 mol %, more preferably 90 mol % to 99.8 mol %, even more preferably 95 mol % to 99.7 mol %. With a degree of saponification of less than 80 mol %, the solubility in water decreases, and it becomes difficult to prepare a spray solution in the form of an aqueous solution, or the coating formed by the agrochemical spray solution obtained lacks sufficient waterfastness. With a degree of saponification of more than 99.9 mol %, the viscosity stability becomes insufficient as a result of rapid viscosity increase during the storage of the agrochemical spray solution obtained.

The ethylene-modified PVA(A) has a 1,2-glycol linkage unit content of 1.2 mol % to 2.0 mol %, preferably 1.3 mol % to 1.9 mol %, more preferably 1.4 mol % to 1.8 mol %. With a 1,2-glycol linkage unit content of less than 1.2 mol %, the viscosity stability of the agrochemical spray solution obtained becomes insufficient. Production of ethylene-modified PVA(A) is difficult with a 1,2-glycol linkage unit content of more than 2.0 mol %. The 1,2-glycol linkage unit content can be controlled by using various methods, for example, by varying the type of vinyl ester, the solvent, the polymerization temperature, or the method of copolymerization of vinylene carbonate. From an industrial standpoint, it is preferable in the present invention to control the 1,2-glycol linkage unit content by polymerization temperature.

For the calculation of 1,2-glycol linkage unit content, the ethylene-modified PVA(A) obtained was dissolved in water inside an open container over a time period of about 2 hours. The solution was cast over a polyethylene terephthalate substrate, and dried to produce a cast film. The film was then dissolved in DMSO-$d_6$, and subjected to $^1$H-NMR (500 MHz) measurement at 80° C.

The ethylene-modified PVA(A) is obtained by, for example, copolymerizing ethylene and a vinyl ester monomer to produce a vinyl ester copolymer having an ethylene unit, and saponifying the vinyl ester copolymer with a saponification catalyst such as sodium hydroxide, followed by optional pulverization and drying.

The copolymerization of ethylene and a vinyl ester monomer may be achieved by using a known method, for example, such as bulk polymerization, solution polymerization, suspension polymerization, or emulsion polymerization. Typically, the copolymerization may be achieved by bulk polymerization or solution polymerization, which takes place without a solvent, or in a solvent such as alcohol. The alcohol may be, for example, a lower alcohol such as methanol, ethanol, or propanol. The copolymerization may use a known polymerization initiator, for example, an azo- or peroxide-based initiator such as 2,2'-azobis(isobutyronitrile), 2,2'-azobis(4-methoxy-2,4-dimethylvaleronitrile), 2,2'-azobis(2,4-dimethyl-valeronitrile), benzoyl peroxide, and n-propyl peroxydicarbonate.

The polymerization temperature is not particularly limited, and is preferably 0° C. to 150° C., more preferably room temperature to 150° C., even more preferably room temperature to the boiling point of the solvent used, particularly preferably 30 to 60° C.

Examples of the vinyl ester monomer include vinyl formate, vinyl acetate, vinyl propionate, vinyl valerate, vinyl caprylate, vinyl laurate, vinyl stearate, vinyl benzoate, vinyl pivalate, and vinyl versatate. Preferred is vinyl acetate.

The ethylene-modified PVA(A) may contain a monomer unit other than the vinyl alcohol unit, the ethylene unit, and the vinyl ester unit, provided that such additional monomer units are not detrimental to the effects of the present invention. Examples of such additional monomer units include:

α-olefins such as propylene, 1-butene, isobutene, and 1-hexene;

unsaturated acids such as acrylic acid, methacrylic acid, crotonic acid, maleic acid, maleic anhydride, and itaconic acid, or salts or mono or dialkyl esters thereof, nitriles such as acrylonitrile and methacrylonitrile;

amides such as acrylamide and methacrylamide;

vinyl ethers such as methyl vinyl ether, ethyl vinyl ether, n-propyl vinyl ether, isopropyl vinyl ether, and n-butyl vinyl ether;

hydroxyl group-containing vinyl ethers such as ethylene glycol vinyl ether, 1,3-propanediol vinyl ether, and 1,4-butanediol vinyl ether;

allyl ethers such as allyl acetate, propyl allyl ether, butyl allyl ether, and hexyl allyl ether;

monomers having an oxyalkylene group;

vinylsilanes such as vinyltrimethoxysilane;

hydroxyl group-containing α-olefins such as 3-buten-1-ol, 4-penten-1-ol, 5-hexen-1-ol, 7-octen-1-ol, 9-decen-1-ol, and 3-methyl-3-buten-1-ol;

monomers having a sulfonic acid group derived from compounds such as ethylenesulfonic acid, allylsulfonic acid, methallylsulfonic acid, and 2-acrylamide-2-methylpropanesulfonic acid, or salts thereof, and monomers having a cation group derived from compounds such as vinyloxyethyltrimethylammonium chloride, vinyloxybutyltrimethylammonium chloride, vinyloxyethyldimethylamine, vinyloxymethyldiethylamine, N-acrylamidemethyltrimethylammonium chloride, 3-(N-methacrylamide)propyltrimethylammonium chloride, N-acrylamideethyltrimethylammonium chloride, N-acrylamidedimethylamine, allyltrimethylammonium chloride, methallyltrimethylammonium chloride, dimethylallylamine, and allylethylamine.

The content of these monomers depends on factors such as the intended use or application, and is preferably 10 mol % or less, more preferably less than 5.0 mol %, and may be preferably less than 1.0 mol %, or less than 0.1 mol %.

Compound (B)

For improved spreadability against surfaces of plant leaves, and improved viscosity stability after long storage of an agrochemical spray solution containing the spreading agent for agrochemicals, it is preferable that the spreading agent for agrochemicals of the present invention comprise 0.1 ppm to 3,000 ppm of a compound (B) having a conjugated double bond and a molecular weight of 1,000 or less, in addition to the ethylene-modified PVA(A). The compound (B) has a structure in which at least two ethylenic double bonds are linked to each other via a single ethylenic single bond. The compound (B) having such conjugated double bonds encompasses a conjugated diene compound of a structure in which two ethylenic double bonds and a single ethylenic single bond are alternately linked to each other, a conjugated triene compound of a structure in which three ethylenic double bonds and two ethylenic single bonds are alternately linked to each other, and a conjugated polyene compound of a structure in which a greater number of ethylenic double bonds and a greater number of ethylenic single bonds are alternately linked to each other. The compound (B) having a conjugated double bond also encompasses a conjugated triene compound such as 2,4,6-octatriene. The compound having a conjugated double bond used in the present invention may be one that has multiple independent sets of conjugated double bonds per molecule. For example, the compound having a conjugated double bond encompasses a compound having three conjugated trienes within the same molecule, as exemplified by wood oil.

The compound (B) may have a functional group other than the conjugated double bond. Examples of such functional groups include a carboxy group and salts thereof, a hydroxyl group, an ester group, a carbonyl group, an ether group, an amino group, a dialkylamino group (for example, an alkylamino group having a linear or branched alkyl group of 1 to 3 carbon atoms, such as a dimethylamino group), an imino group, an amide group, a cyano group, a diazo group, a nitro group, a mercapto group, a sulfone group, a sulfoxide group, a sulfide group, a thiol group, a sulfonic acid group and salts thereof, a phosphoric acid group and salts thereof, a phenyl group, and a halogen atom. The functional group may be directly bound to a carbon atom of the conjugated double bond, or may be bound at a position some distance away from the conjugated double bond. A multiple bond in the functional group may be at a position that allows conjugation with the conjugated double bond. For example, the compound (B) encompasses 1-phenylbutadiene, which has a phenyl group, and sorbic acid, which has a carboxy group. The compound (B) may have a nonconjugated double bond. The compound (B) may have a nonconjugated triple bond. Specific examples of the compound (B) include 2,4-diphenyl-4-methyl-1-pentene, 1,3-diphenyl-1-butene, 2,3-dimethyl-1,3-butadiene, 4-methyl-1,3-pentadiene, 1-phenyl-1,3-butadiene, sorbic acid, and myrcene.

The compound (B) is not particularly limited, as long as it has a conjugated double bond. The compound (B) may be (i) a compound (B-1) having an unsaturated aliphatic group with a conjugated double bond, or (ii) a compound (B-2) forming a conjugated double bond with an unsaturated aliphatic group and an aromatic group. Examples of the compound (B-1) having an unsaturated aliphatic group with a conjugated double bond include 2,3-dimethyl-1,3-butadiene, and sorbic acid. Example of the compound (B-2) forming a conjugated double bond with an unsaturated aliphatic group and an aromatic group include 2,4-diphenyl-4-methyl-1-pentene, and 1,3-diphenyl-1-butene. Preferred for enhanced effects of the present invention is the compound (B-1) having an unsaturated aliphatic group with a conjugated double bond. It is also preferable to select a compound having a conjugated double bond and a polar group. For compound (B), the compound (B-1) having an unsaturated aliphatic group with a conjugated double bond is more preferably a compound having a polar group, even more preferably a conjugated diene compound having a polar group. The polar group may be selected from the functional groups exemplified above, including, for example, a carboxy group and salts thereof, a hydroxyl group, an ester group, a carbonyl group, an ether group, an amino group, a dialkylamino group, an imino group, an amide group, a cyano group, a diazo group, a nitro group, a mercapto group, a sulfone group, a sulfoxide group, a sulfide group, a thiol group, a sulfonic acid group and salts thereof, a phosphoric acid group and salts thereof, and a halogen atom. Preferred are a carboxy group and salts thereof, and a hydroxyl group.

The compound (B) has a molecular weight of preferably 1,000 or less, more preferably 800 or less, even more preferably 500 or less. The content of compound (B) is preferably 0.1 ppm to 3,000 ppm, more preferably 1 ppm to 2,000 ppm, even more preferably 3 ppm to 1,500 ppm, particularly preferably 5 ppm to 1,000 ppm. Here, the content of compound (B) means the content of compound (B) (ppm by mass) relative to the total mass of the ethylene-modified PVA(A) and compound (B). With the molecular weight and the content of compound (B) confined in these ranges, the agrochemical spray solution obtained can have even more improved long-term storage stability.

For improved long-term storage stability of the agrochemical spray solution obtained, it is preferable to add compound (B) after obtaining the vinyl ester copolymer having an ethylene unit, and before saponifying the vinyl ester copolymer.

Agrochemical Spray Solution

Preferably an agrochemical spray solution of the present invention comprises the spreading agent for agrochemicals, an active agrichemical component, and water, and may comprise a solvent other than water. The content of ethylene-modified PVA(A) is preferably 0.01 mass % to 10 mass %, more preferably 0.05 mass % to 8 mass %, even more preferably 0.1 mass % to 5 mass % relative to the total amount of the agrochemical spray solution. The properties of the agrochemical spray solution, including spreadability and sprayability, further improve with the ethylene-modified PVA(A) content falling in these ranges.

The total solid content in the agrochemical spray solution is preferably 0.001 mass % to 20 mass %, more preferably 0.01 mass % to 10 mass %. When the total solid content is less than 0.001 mass %, it often becomes difficult to provide necessary amounts of active agrichemical component. When the total solid content is more than 20 mass %, contamination by the excess active agrichemical component often becomes a problem.

The method of production of the agrochemical spray solution is not particularly limited. However, from the standpoint of obtaining a homogenous agrochemical spray solution having desirable solubility, it is preferable to mix the active agrichemical component with a solution (particularly an aqueous solution) of the ethylene-modified PVA (A)-containing spreading agent for agrochemicals. The concentration of the ethylene-modified PVA(A) in the solution of the spreading agent for agrochemicals is preferably 0.1 mass % to 20 mass %, more preferably 1 mass % to 15 mass %.

The content of the active agrichemical component is preferably 0.1 parts by mass to 1,000 parts by mass, more preferably 1 part by mass to 500 parts by mass relative to 100 parts by mass of the ethylene-modified PVA(A). When the content of the active agrichemical component is less than 0.1 parts by mass, it often becomes difficult to provide necessary amounts of active agrichemical component. Spreadability often decreases when the content of the active agrichemical component is more than 1,000 parts by mass.

The agrochemical spray solution may be diluted with a solvent such as water so as to make the viscosity preferably 200 mPa·s or less, more preferably 100 mPa·s or less, even more preferably 0.1 to 80 mPa·s, as measured at 20° C. in compliance with JIS K 6726:1994. Sprayability often decreases when the viscosity of the agrochemical spray solution is too high.

In the agrochemical spray solution, the ethylene-modified PVA(A) contained as a spreading agent does not have a crosslinked structure, and the agrochemical spray solution shows excellent storage stability even during long storage. Specifically, the agrochemical spray solution has a ratio $(\eta_{1-week}/\eta_{initial})$ of preferably 1 or more and less than 5, more preferably 1 or more and less than 2.5 at 5° C. and 12 rpm, wherein $\eta_{initial}$ is the initial viscosity of the agrochemical spray solution, and $\eta_{1-week}$ is the viscosity of the agrochemical spray solution left to stand for 1 week. The viscosity ratio is measured in the manner described in the Examples below.

Examples of the active agrichemical component include herbicides, pesticides, disinfectants, plant regulators, and fertilizers. Preferably, the active agrichemical component has a liquid or a powder form at ordinary temperature (21° C.). It is particularly preferable that the active agrichemical component contained be a water-soluble active agrichemical component having a saturation solubility of 50 ppm or more against ordinary-temperature water (21° C.). The active agrichemical component may be used alone, or two or more thereof may be used in combination.

Examples of the herbicides include 2,4-PA, MCP MCPB, MCPA-thioethyl (phenothiol), clomeprop, naproanilide, CNP, chlomethoxynil, bifenox, MCC, benthiocarb, esprocarb, molinate, dimepiperate, DCPA, butachlor, pretilachlor, bromobutide, mefenacet, dymron, simetryn, prometryn, dimethametryn, bentazon, oxadiazon, pyrazolate, pyrazoxyfen, benzofenap, trifluralin, piperophos, ACN, and bensulfuron-methyl.

Examples of the pesticides include MPP, MEP, ECP, pirimiphos-methyl, diazinon, isoxathion, pyridaphenthion, chlorpyrifos-methyl, chlorpyrifos, ESP, vamidothion, profenofos, malathion, PAP, dimethoate, formothion, thiometon, ethylthiometon, phosalone, PMP DMTP, prothiofos, sulprofos, pyraclofos, DDVP, monocrotophos, BRP, CVMP, dimethylvinphos, CVP, propaphos, acephate, isofenphos, salithion, DEP, EPN, ethion, NAC, MTMC, MIPC, BPMC, PHC, MPMC, XMC, ethiofencarb, bendiocarb, pirimicarb, carbosulfan, benfuracarb, methomyl, thiodicarb, alanycarb, allethrins, resmethrin, permethrin, cypermethrin, cyhalothrin, cyfluthrin, fenpropathrin, tralomethrin, cycloprothrin, fenvalerate, flucythrinate, fluvalinate, etofenprox, cartap, thiocyclam, bensultap, diflubenzuron, teflubenzuron, chlorfluazuron, buprofezin, fenoxycarb, pyrethrum, derris, nicotine sulfate, machine oil, rapeseed oil, CPCBS, Kelthane, chlorobenzilate, phenisobromolate, tetradifon, BPPS, quinoxaline, amitraz, benzomate, fenothiocarb, hexythiazox, fenbutatin oxide, dienochlor, fenpyroximate, fluazinam, pyridaben, clofentezine, DPC, a polynactin complex, milbemectin, DCIP, dazomet, benzoepin, metaldehyde, DCV BT, and fenitrothion.

Examples of the disinfectants include kasugamycin, benomyl, tiabendazole, thiophanate-methyl, thiuram, prochloraz, triflumizole, ipconazole, basic copper chloride, basic copper sulfate, copper(II) hydroxide, cupric nonylphenolsulfonate, DBEDC, copper terephthalate, inorganic sulfur, zineb, maneb, manzeb, amobum, polycarbamate, organic nickel, propineb, ziram, thiadiazine, captan, sulfenic acids, TPN, fthalide, IBP, EDDP, tolclofos-methyl, pyrazophos, fosetyl, carbendazole, diethofencarb, iprodione, vinclozolin, procymidone, fluoroimide, oxycarboxin, mepronil, flutolanil, tecloftalam, trichlamide, pencycuron, metalaxyl, oxadixyl, triadimefon, bitertanol, myclobutanil, hexaconazole, propiconazole, fenarimol, pyrifenox, triforine, blasticidin S, polyoxins, validamycin, streptomycin, oxytetracycline, mildiomycin, PCNB, hydroxyisoxazole, echlomezol, chloroneb, methasulfocarb, methyl isothiocyanate, organoarsenic compounds, zinc sulfate, dithianon, benzothiazole, quinoxalines, CNA, dimethirimol, diclomezine, triazine, ferimzone, fluazinam, probenazole, isoprothiolane, tricyclazole, pyroquilon, oxolinic acid, iminoctadine acetate, alginic acid, microbial antagonists, extracts of Lentinura edodes mycelium, substances produced by Aspergillus oryzae, Agrobacterium radiobacter, and imibenconazole.

Examples of the plant regulators include inabenfide, oxyethylene docosanol, nicotinamide, and benzylaminopurine.

Examples of the fertilizers include oxamide, crotonylidene diurea (CDU), isobutylidene diurea (IB), ureaform, fused phosphate fertilizers, mixed phosphoric acid fertilizers, by-product lime fertilizers, calcium carbonate fertilizers, mixed lime fertilizers, slag silicate fertilizers, silicate fertilizers, magnesium hydroxide fertilizers, by-product magnesium fertilizers, processed magnesium fertilizers, slag manganese fertilizers, and fused trace-element fertilizers. It is also possible to use processed slag phosphoric acid fertilizers, which are intended for supply of silicic acid and pH correction with alkalis, as with the case of slag silicate fertilizers. Preferred are oxamide, crotonylidene diurea (CDU), isobutylidene diurea (IB), ureaform, processed slag phosphoric acid fertilizers, slag silicate fertilizers, and mixed phosphoric acid fertilizers.

The agrochemical spray solution of the present invention may contain other components, provided that it is not detrimental to the effects of the present invention. Examples of such other components include other spreading agents, PVAs other than the ethylene-modified PVA(A), water-soluble resins other than PVAs, emulsifiers, wettable powders, flowables, surfactants, thickeners, cross-linking agents, and preservatives. The content of other components is preferably 10 mass % or less, more preferably 5 mass % or less relative to the total amount of the agrochemical spray solution.

The present invention encompasses combinations of the foregoing features, provided that such combinations made in various forms within the technical idea of the present invention can produce the effects of the present invention.

EXAMPLES

The following describes the present invention in greater detail by way of Examples. It should be noted that the present invention is in no way limited by the following Examples, so long as the descriptions of the Examples below remain within the gist of the present invention. In the Examples and Comparative Examples below, the following methods were used for the measurements and evaluations of the viscosity-average degree of polymerization and the degree of saponification of ethylene-modified PVA(A), the content of 1,2-glycol linkage unit, and the viscosity stability and the spreadability of the agrochemical spray solution.

Viscosity-Average Degree of Polymerization of Ethylene-Modified PVA(A) The viscosity-average degree of polymerization of ethylene-modified PVA was determined using the method described in JIS K 6726 (1994).

Degree of Saponification of Ethylene-Modified PVA(A) The degree of saponification of ethylene-modified PVA was determined using the method described in JIS K 6726 (1994).

Content of 1,2-Glycol Linkage Unit of Ethylene-Modified PVA(A) The ethylene-modified PVA obtained in each Example was dissolved in water inside an open container over a time period of about 2 hours. The solution was cast over a polyethylene terephthalate substrate, and dried to produce a cast film. The film was then dissolved in DMSO-$d_6$ to make a 0.1 mass % solution, and subjected to $^1$H-NMR (500 MHz) measurement at 80° C. after adding several drops (about 0.1 ml) of trifluoroacetic acid. The content of the 1,2-glycol linkage unit (a monomer unit linked by 1,2-glycol linkage) contained in the purified PVA is calculated from the peak (3.2 to 4.0 ppm; integral value a) derived from the methine proton of the vinyl alcohol unit, and the peak (3.25 ppm; integral value P) derived from one of the methine protons of the 1,2-glycol linkage unit, using the following formula (I).

$$\text{Content of 1,2-Glycol Linkage Unit in PVA (mol \%)} = 100 \times \beta/\alpha \quad \text{Formula (I)}$$

Viscosity Stability of Agrochemical Spray Solution

The agrochemical spray solution obtained in each of the Examples and Comparative Examples described below was put in a 300-ml glass beaker. After allowing it to stand at 5° C. for 1 week, the ratio of one-week viscosity (11-wk) at 5° C. to initial viscosity ($\eta_{initial}$) at 5° C. (thickening rate=$\eta_{1\text{-}week}/\eta_{initial}$) was determined, and the result was evaluated according to the following criteria. The measurement was carried out at 5° C. and 12 rpm using a B-type viscometer according to the rotational viscometer method of JIS K 6726 (1994).

A: $\eta_{1\text{-}week}/\eta_{initial}$=1 or more and less than 2.5
B: $\eta_{1\text{-}week}/\eta_{initial}$=2.5 or more and less than 5
C: $\eta_{1\text{-}week}/\eta_{initial}$=5 or more Spreadability Evaluation The agrochemical spray solution obtained in each of the Examples and Comparative Examples described below was sprayed onto surfaces of plant leaves (schefflera leaves) with a sprayer to impart a color. After allowing the solution to stand for 24 hours, water was sprayed onto the same leaf surface (the surface sprayed with the agrochemical spray solution) with a sprayer for a total of 10 times. The leaf surface with the remaining agrochemical spray solution spread on the surface but did not drip was visually inspected, and the percentage of the spread area with respect to the area of the surface sprayed with the agrochemical spray solution was measured. The result was then evaluated according to the following criteria.

A: Remaining colored surface=80% or more

B: Remaining colored surface=40% or more and less than 80%

C: Remaining colored surface=less than 40%

Example 1

PVA-1: Production of Ethylene-Modified PVA(A)

A 250-L pressure reaction vessel equipped with a stirrer, a nitrogen inlet, an ethylene inlet, and a polymerization initiator feed port was charged with 106.1 kg of vinyl acetate, and 43.9 kg of methanol. The system was then replaced with nitrogen by bubbling nitrogen for 30 minutes after increasing the temperature to 60° C. This was followed by feeding of ethylene to make the pressure inside the reaction vessel 1.4 kg/cm². Separately, a 2.8 g/L methanol solution of 2,2'-azobis(4-methoxy-2,4-dimethylvaleronitrile) (AMV; polymerization initiator) was prepared, and this was followed by nitrogen replacement by bubbling nitrogen gas. After adjusting the internal temperature of the reaction vessel to 60° C., 53 ml of the polymerization initiator solution was injected to initiate polymerization. Throughout the polymerization, the reaction vessel pressure was maintained at 1.4 kg/cm² by feeding ethylene, and the reaction was carried out at the maintained polymerization temperature of 60° C. while continuously adding AMV at 168 ml/hr, using the polymerization initiator solution. Upon the polymerization conversion rate reaching 20% after 4 hours, 2.22 g of sorbic acid was added, and the polymerization reaction was ceased by cooling the reaction mixture. Ethylene was removed by opening the reaction vessel, and nitrogen gas was bubbled. Thereafter, the unreacted vinyl acetate monomer was removed under reduced pressure to obtain a methanol solution of polyvinyl acetate (hereinafter, also referred to as "PVAc" for short). This was followed by saponification, which was carried out at 40° C. by adding 46.5 g of an alkaline solution (a 10 mass % methanol solution of NaOH) to 400 g of the PVAc methanol solution (containing 100 g of PVAc) that had been adjusted to a concentration of 25 mass % by adding methanol to the PVAc solution (the mole ratio [MR] of the alkali to the vinyl acetate unit in PVAc is 0.08). After adding the alkali, the resulting gel was pulverized with a pulverizer, and a saponification reaction was allowed for a total of 1 hour. The remaining alkali was neutralized by adding 1,000 g of methyl acetate. After confirming the completion of neutralization with a phenolphthalein indicator, 1,000 g of methanol was added to the white-solid PVA obtained by filtration, and the mixture was left to stand at room temperature for 3 hours for washing. The washing procedure was repeated three times, and the resulting PVA, after centrifugal removal of liquid component, was left to stand in a drier at 70° C. for 2 days to obtain an ethylene-modified PVA (PVA-1) of the present invention. Table 2 shows the physical properties of PVA-1.

Preparation of Agrochemical Spray Solution

PVA-1 was used to prepare a 5 mass % aqueous solution, and 0.5 parts by mass of an active agrochemical component (Orthion manufactured by Sumitomo Chemical Garden Products, Co., Ltd., containing acephate and MEP as active components) was added to 100 parts by mass of the PVA aqueous solution so prepared. The viscosity of the agrochemical spray solution prepared from PVA-1 was then evaluated according the method described above. For spreadability evaluation of the agrochemical spray solution, 0.2 parts by mass of food dye was added, and the solution was evaluated according to the method described above. The results are presented in Table 2.

Examples 2 to 5

Production of PVA-2 to PVA-5, and Preparation of Agrochemical Spray Solution

PVAs (PVA-2 to PVA-5) were produced in the same manner as in Example 1, except that the amounts of ethylene, vinyl acetate, methanol, and polymerization initiator, the type and amount of compound (B), polymerization temperature, polymerization time, polymerization conversion rate, the concentration of PVAc solution and the amount of saponification catalyst in saponification, and saponification temperature were varied as shown in Table 1. Table 2 shows the physical properties of PVA-2 to PVA-5. For each example, an agrochemical spray solution was prepared in the same manner as in Example 1, except that PVA-2 to PVA-5 were used instead of PVA-1. The viscosity stability and the spreadability of the agrochemical spray solution were evaluated according to the methods described above. The results are presented in Table 2.

Comparative Example 1

Production of PVA-i, and Preparation of Agrochemical Spray Solution

A reaction vessel equipped with a stirrer, a nitrogen inlet, and a polymerization initiator feed port was charged with 2.4 kg of vinyl acetate, and 1.0 kg of methanol. The system was then replaced with nitrogen by bubbling nitrogen for 30 minutes after increasing the temperature to 60° C. Separately, a 10 mass % methanol solution of 2,2'-azobis(isobutyronitrile) (AIBN; polymerization initiator) was prepared, and this was followed by nitrogen replacement by bubbling nitrogen gas. After adjusting the internal temperature of the reaction vessel to 60° C., 10 ml of the polymerization initiator solution was injected to initiate polymerization. Upon the polymerization conversion rate reaching 30% after 1.4 hours, 0.1 g of 1,3-diphenyl-1-butene was added, and the polymerization reaction was ceased by cooling the reaction mixture. The unreacted vinyl acetate monomer was then removed to obtain a PVAc methanol solution. This was followed by saponification, which was carried out at 40° C. by adding 32.6 g of an alkaline solution (a 10 mass % methanol solution of NaOH) to 400 g of the PVAc methanol solution (containing 100 g of PVAc) that had been adjusted to a concentration of 25 mass % by adding methanol to the PVAc solution (the mole ratio [MR] of the alkali to the vinyl acetate unit in PVAc is 0.008). After adding the alkali, the resulting gel was pulverized with a pulverizer, and a saponification reaction was allowed for a total of 1 hour. The remaining alkali was neutralized by adding 1,000 g of methyl acetate. After confirming the completion of neutralization with a phenolphthalein indicator, 1,000 g of methanol was added to the white-solid PVA obtained by filtration, and the mixture was left to stand at room temperature for 3 hours for washing. The washing procedure was repeated three times, and the resulting PVA, after centrifugal removal of liquid component, was left to stand in a drier at 70° C. for 2 days to obtain a PVA (PVA-i). Table 2 shows the physical properties of PVA-i. An agrochemical spray solution was prepared in the same manner as in Example 1, except that PVA-i was used instead of PVA-1. The viscosity stability and the spreadability of the agrochemical spray solution were evaluated according to the methods described above. The results are presented in Table 2.

Comparative Example 2

Production of PVA-ii

PVA-ii was produced in the same manner as in Comparative Example 1, except that the amount of vinyl acetate, polymerization time, polymerization conversion rate, the type of compound (B), and the concentration of PVAc solution and the amount of saponification catalyst in saponification were varied as shown in Table 1. Table 2 shows the physical properties of PVA-ii. An agrochemical spray solution was prepared in the same manner as in Example 1, except that PVA-ii was used instead of PVA-1. The viscosity stability and the spreadability of the agrochemical spray solution were evaluated according to the methods described above. The results are presented in Table 2.

Comparative Example 3

Production of PVA-iii

A 5-L pressure reaction vessel equipped with a stirrer, a nitrogen inlet, an ethylene inlet, and a polymerization initiator feed port was charged with 1.36 kg of vinyl acetate, and 2.04 kg of methanol. The system was then replaced with nitrogen by bubbling nitrogen at 0° C. for 30 minutes. This was followed by feeding of ethylene to make the pressure inside the reaction vessel 0.2 kg/cm$^2$. Thereafter, 81.6 g of 2,2'-azobis(4-methoxy-2,4-dimethylvaleronitrile) (AMV) was added as a polymerization initiator to initiate polymerization. Throughout the polymerization, the reaction vessel pressure was maintained at 0.2 kg/cm$^2$ by feeding ethylene, and the reaction was carried out at the maintained polymerization temperature of 0° C. The polymerization reaction was ceased upon the polymerization conversion rate reaching 60% after 35 hours. Ethylene was removed by opening the reaction vessel, and nitrogen gas was bubbled. Thereafter, the unreacted vinyl acetate monomer was removed under reduced pressure to obtain a PVAc methanol solution. This was followed by saponification, which was carried out at 60° C. by adding 46.5 g of an alkaline solution (a 10 mass % methanol solution of NaOH) to 400 g of the PVAc methanol solution (containing 100 g of PVAc) that had been adjusted to a concentration of 25 mass % by adding methanol to the PVAc solution (the mole ratio [MR] of the alkali to the vinyl acetate unit in PVAc is 0.20). After adding the alkali, the resulting gel was pulverized with a pulverizer, and a saponification reaction was allowed for a total of 1 hour. The remaining alkali was neutralized by adding 1,000 g of methyl acetate. After confirming the completion of neutralization with a phenolphthalein indicator, 1,000 g of methanol was added to the white-solid PVA obtained by filtration, and the mixture was left to stand at room temperature for 3 hours for washing. The washing procedure was repeated three times, and the resulting PVA, after centrifugal removal of liquid component, was left to stand in a drier at 70° C. for 2 days to obtain a PVA (PVA-iii). Table 2 shows the physical properties of PVA-iii. An agrochemical spray solution was prepared in the same manner as in Example 1, except that PVA-iii was used instead of PVA-1. The viscosity stability and the spreadability of the agrochemical spray solution were evaluated according to the methods described above. The results are presented in Table 2.

TABLE 1

| | | | | | Polymerization conditions | | | | | | |
|---|---|---|---|---|---|---|---|---|---|---|---|
| | | | | | | Initiator | | | | Polymerization | Compound (B) |
| | Polymer type | Vinyl acetate (kg) | Methanol (kg) | Ethylene pressure (kg/cm$^2$) | Type[1] | Amount charged (ml) | Sequential addition (ml/hr) | Temp. (° C.) | Time (hr) | conversion rate (%) | Type | Amount added (g) |
| Example 1 | PVA-1 | 106.1 | 43.9 | 1.4 | AMV | 53 | 168 | 60 | 4 | 20 | Sorbic acid | 2.22 |
| Example 2 | PVA-2 | 106.1 | 43.9 | 1.4 | AMV | 53 | 168 | 60 | 4 | 20 | — | — |
| Example 3 | PVA-3 | 132.4 | 17.5 | 6 | AMV | 293 | 923 | 60 | 2 | 20 | 2,4-Diphenyl-4-methyl-1-pentene | 13.8 |
| Example 4 | PVA-4 | 76.6 | 73.3 | 6.5 | AMV | 175 | 552 | 60 | 3 | 20 | 1,3-Diphenyl-1-butene | 0.8 |
| Example 5 | PVA-5 | 36.4 | 112.8 | 3.5 | AMV | 3962 | 887 | 40 | 4 | 30 | Sorbic acid | 30.0 |
| Com. Ex. 1 | PVA-i | 2.4 | 1.0 | — | AIBN | 10[2] | — | 60 | 1.4 | 30 | 1,3-Diphenyl-1-butene | 0.1 |
| Com. Ex. 2 | PVA-ii | 0.59 | 1.0 | — | AIBN | 10[2] | — | 60 | 3 | 50 | 2,4-Diphenyl-4-methyl-1-pentene | 0.1 |
| Com. Ex. 3 | PVA-iii | 1.36 | 2.04 | 0.2 | AMV | 81.6 (g)[3] | — | 0 | 35 | 60 | — | — |

| | Saponification conditions | | |
|---|---|---|---|
| | PVAc concentration (mass %) | Amount of alkali (MR) | Temp. (° C.) |
| Example 1 | 25 | 0.08 | 40 |
| Example 2 | 25 | 0.20 | 60 |
| Example 3 | 25 | 0.08 | 40 |
| Example 4 | 35 | 0.02 | 40 |
| Example 5 | 40 | 0.01 | 40 |
| Com. Ex. 1 | 25 | 0.008 | 40 |
| Com. Ex. 2 | 40 | 0.01 | 40 |
| Com. Ex. 3 | 25 | 0.20 | 60 |

[1]AMV: 2,2'-azobis(4-methoxy-2,4-dimethylvaleronitrile), AIBN: 2,2'-azobis(isobutyronitrile)
[2]A 10% methanol solution of AIBN
[3]Mass of AMV powder

TABLE 2

| | Ethylene-modified PVA(A) | | | | | Compound (B) | |
| --- | --- | --- | --- | --- | --- | --- | --- |
| | Type | Ethylene unit content (mol %) | Degree of polymerization | Degree of saponification (mol %) | 1,2-Glycol linkage unit content (mol %) | Content[1] (parts by mass) | Type | Content[2] (ppm) |
| Example 1 | PVA-1 | 3 | 1500 | 98.0 | 1.7 | 5 | Sorbic acid | 20 |
| Example 2 | PVA-2 | 3 | 1500 | 99.5 | 1.7 | 5 | — | — |
| Example 3 | PVA-3 | 6 | 1850 | 98.8 | 1.6 | 5 | 2,4-Diphenyl-4-methyl-1-pentene | 105 |
| Example 4 | PVA-4 | 8 | 500 | 95.0 | 1.5 | 5 | 1,3-Diphenyl-1-butene | 67 |
| Example 5 | PVA-5 | 4 | 350 | 93.0 | 1.7 | 5 | Sorbic acid | 630 |
| Com. Ex. 1 | PVA-i | 0 | 1700 | 88.0 | 1.6 | 5 | 1,3-Diphenyl-1-butene | 40 |
| Com. Ex. 2 | PVA-ii | 0 | 500 | 93.0 | 1.6 | 5 | 2,4-Diphenyl-4-methyl-1-pentene | 60 |
| Com. Ex. 3 | PVA-iii | 3 | 1500 | 99.5 | 1.0 | 5 | — | — |

| | Evaluation of agrochemical spray solution | |
| --- | --- | --- |
| | Viscosity stability | Spreadability |
| Example 1 | A | A |
| Example 2 | B | A |
| Example 3 | A | A |
| Example 4 | A | A |
| Example 5 | A | B |
| Com. Ex. 1 | A | C |
| Com. Ex. 2 | A | C |
| Com. Ex. 3 | C | A |

[1] Content of PVA(A) relative to 100 parts by mass of agrochemical spray solution (parts by mass)
[2] Content of compound (B) relative to total mass of PVA(A) and compound (B) (ppm by mass)

INDUSTRIAL APPLICABILITY

A spreading agent for agrochemicals of the present invention contains a specific ethylene-modified PVA(A), and excels in spreadability. An agrochemical spray solution obtained by using the spreading agent for agrochemicals shows excellent viscosity stability even during long storage. This makes the agrochemical spray solution effective for use as a liquid spray solution (for example, a spray solution for leaves, stems, and fruits) in agriculture.

The invention claimed is:

1. An agrochemical spray solution, comprising a spreading agent for agrochemicals, an active agrichemical component, and water,
    wherein the spreading agent for agrochemicals comprises an ethylene-modified vinyl alcohol polymer (A) having an ethylene unit content of 1.0 mol % to 19 mol %, a 1,2-glycol linkage unit content of 1.2 mol % to 2.0 mol %, a viscosity-average degree of polymerization of 200 to 5,000, and a degree of saponification of 80 mol % to 99.9 mol %.

2. The agrochemical spray solution according to claim 1, wherein the ethylene-modified vinyl alcohol polymer (A) has a degree of saponification of 95 mol % to 99.7 mol %.

3. The agrochemical spray solution according to claim 1, wherein the spreading agent further comprises 0.1 ppm to 3,000 ppm of a compound (B) having a conjugated double bond and a molecular weight of 1,000 or less.

4. The agrochemical spray solution according to claim 3, wherein the compound (B) is (i) a compound (B-1) having an unsaturated aliphatic group with a conjugated double bond, or (ii) a compound (B-2) forming a conjugated double bond with an unsaturated aliphatic group and an aromatic group.

5. The agrochemical spray solution according to claim 3, wherein the compound (B) is a conjugated diene compound.

6. The agrochemical spray solution according to claim 3, wherein the compound (B) has at least one functional group selected from the group consisting of a carboxy group and salts thereof, a hydroxyl group, an ester group, a carbonyl group, an ether group, an amino group, a dialkylamino group, an imino group, an amide group, a cyano group, a diazo group, a nitro group, a mercapto group, a sulfone group, a sulfoxide group, a sulfide group, a thiol group, a sulfonic acid group and salts thereof, a phosphoric acid group and salts thereof, a phenyl group, and a halogen atom.

7. The agrochemical spray solution according to claim 3, wherein the compound (B) is a compound (B-1) having an unsaturated aliphatic group with a conjugated double bond, and the compound (B-1) has a polar group.

8. The agrochemical spray solution according to claim 7, wherein the polar group is a compound having at least one functional group selected from the group consisting of a carboxy group and salts thereof, a hydroxyl group, an ester group, a carbonyl group, an ether group, an amino group, a dialkylamino group, an imino group, an amide group, a cyano group, a diazo group, a nitro group, a mercapto group, a sulfone group, a sulfoxide group, a sulfide group, a thiol group, a sulfonic acid group and salts thereof, a phosphoric acid group and salts thereof, and a halogen atom.

9. The agrochemical spray solution according to claim 1, wherein a content of the active agrichemical component is 0.1 parts by mass to 1,000 parts by mass relative to 100 parts by mass of the ethylene-modified vinyl alcohol polymer (A).

10. The agrochemical spray solution according to claim 1, wherein the agrochemical spray solution has a ratio ($\eta_{1\text{-week}}/\eta_{initial}$) of less than 5 at 5° C. and 12 rpm, wherein $\eta_{initial}$ is an initial viscosity of the agrochemical spray solution, and $\eta_{1\text{-week}}$ is a viscosity of the agrochemical spray solution left to stand for 1 week.

* * * * *